United States Patent
Olson et al.

(12) 
(10) Patent No.: US 6,361,826 B2
(45) Date of Patent: Mar. 26, 2002

(54) POLYMER SURFACE COATING MADE BY COALESCING A POLYMER PARTICULATE WITH A COALESCING AGENT

(75) Inventors: Keith E. Olson, Apple Valley; Bryan M. Anderson, St. Paul, both of MN (US); Robert D. P. Hei, Baldwin, WI (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 09/887,844

(22) Filed: Jun. 22, 2001

Related U.S. Application Data

(62) Division of application No. 09/301,164, filed on Apr. 28, 1999.

(51) Int. Cl.$^7$ ............................. B05D 01/12; G09D 7/14
(52) U.S. Cl. ....................... 427/189; 427/195; 427/201
(58) Field of Search ............................... 427/189, 195, 427/201

(56) References Cited

U.S. PATENT DOCUMENTS

| | | |
|---|---|---|
| 3,328,325 A | 6/1967 | Zdanowski |
| 3,711,436 A | 1/1973 | Oliver et al. |
| 3,728,418 A | 4/1973 | Gleason |
| 3,776,752 A | 12/1973 | Craven |
| 3,785,860 A | 1/1974 | Zdanowski |
| 3,808,036 A | 4/1974 | Zdanowski |
| 3,855,170 A | 12/1974 | Junkin et al. |
| 3,900,438 A | 8/1975 | Zdanowski et al. |
| 4,017,662 A | 4/1977 | Gehman et al. |
| 4,022,730 A | 5/1977 | Lewis et al. |
| 4,046,726 A | 9/1977 | Meiner et al. |
| 4,071,645 A | 1/1978 | Kahn |
| 4,131,585 A | 12/1978 | Feigin |
| 4,150,005 A | 4/1979 | Gehman et al. |
| 4,151,138 A * | 4/1979 | Citrone et al. ......... 260/28.5 V |
| 4,168,255 A | 9/1979 | Lewis et al. |
| 4,196,259 A | 4/1980 | Augustin et al. |
| 4,278,578 A | 7/1981 | Carpenter |
| 4,299,749 A | 11/1981 | McCarthy et al. |
| 4,317,755 A | 3/1982 | Gregory |
| 4,363,835 A | 12/1982 | Hackett et al. |
| 4,376,175 A | 3/1983 | Posten |
| 4,421,782 A | 12/1983 | Bolgiano et al. |
| 4,460,734 A | 7/1984 | Owens et al. |
| 4,517,330 A | 5/1985 | Zdanowski et al. |
| 4,526,815 A | 7/1985 | Hackett et al. |
| 4,565,644 A | 1/1986 | Smith et al. |
| 4,704,429 A | 11/1987 | Hackett et al. |
| 4,747,880 A * | 5/1988 | Berrido et al. .............. 106/207 |
| 4,869,934 A | 9/1989 | Jethwa |
| 5,055,132 A | 10/1991 | Fernandez et al. |
| 5,169,884 A | 12/1992 | Lindermann et al. |
| 5,319,018 A | 6/1994 | Owens et al. |
| 5,356,968 A | 10/1994 | Rupaner et al. |
| 5,385,604 A | 1/1995 | Ainslie |
| 5,428,095 A | 6/1995 | Swidler |
| 5,445,670 A | 8/1995 | Each et al. |
| 5,494,707 A | 2/1996 | Wang et al. |
| 5,498,670 A | 3/1996 | Aoyama et al. |
| 5,532,291 A | 7/1996 | Wright et al. |
| 5,536,571 A | 7/1996 | Pearson et al. |
| 5,541,265 A | 7/1996 | Giorni et al. |
| 5,543,232 A | 8/1996 | Ehrhart et al. |
| 5,574,117 A | 11/1996 | Yoshida et al. |
| 5,645,664 A | 7/1997 | Clyne |
| 5,660,904 A | 8/1997 | Andersen et al. |
| 5,676,741 A | 10/1997 | Gray et al. |
| 5,693,390 A | 12/1997 | Inagaki et al. |
| 5,736,196 A | 4/1998 | Decker et al. |
| 5,747,597 A | 5/1998 | Fujita et al. |
| 5,753,758 A | 5/1998 | Marchese |
| 5,760,113 A | 6/1998 | Mitsutake et al. |
| 5,776,373 A | 7/1998 | Bergmann et al. |
| 5,830,937 A | 11/1998 | Shalov et al. |

FOREIGN PATENT DOCUMENTS

| | | | |
|---|---|---|---|
| CA | 717495 | 9/1965 | |
| EP | 00174643 A1 | 3/1986 | |
| EP | 00358984 A2 | 3/1990 | |
| GB | 930919 | 7/1963 | |
| JP | 53016-734 | 2/1978 | |
| JP | 53016-741 | 2/1978 | |
| JP | 56-32569 | 4/1981 | |
| JP | 06-33016 | 2/1994 | |
| JP | 06-93232 | 4/1994 | |
| JP | 06-93233 | 4/1994 | |
| JP | 6-93233 * | 4/1994 | ............ C09G/1/00 |
| JP | 06-128444 | 5/1994 | |

OTHER PUBLICATIONS

"Coating Processes," "Coatings", "Coatings, Marine", "Cobalt and Cobalt Alloys", "Cobalt Compounds", Kirk–Othemer Encyc. Chem., 4th ed., pp. 469–483 (Wiley 1999).

* cited by examiner

Primary Examiner—David W. Wu
Assistant Examiner—K. C. Egwim
(74) Attorney, Agent, or Firm—Merchant & Gould P.C.

(57) ABSTRACT

Continuous coatings are prepared using novel two part compositions and methods. The two part compositions of the invention comprise, in separate containers, a powder polymer composition and a coalescing agent. The powder composition has preferred particle size distribution and composition for use in the compositions or methods of the invention. The coalescing agents of the invention cooperate with the powder part to result in a excellent finish having the appropriate drying hardness, durability, etc. The novel method of the invention involves contacting a coalescing agent with polymer particles in a variety of coating methods. The particles and the coalescing agent interact to form a continuous coating layer or finish layer. The basic coating formation methods of the invention can be embodied in a number of methods or protocols including applying a solid polymer to the liquid coalescing agent, applying the agent to the polymer particulate or applying the liquid and polymer simultaneously. In any protocol, a desirable floor finish can be easily formed. This invention is particularly suitable for a floor finish composition.

87 Claims, No Drawings

POLYMER SURFACE COATING MADE BY COALESCING A POLYMER PARTICULATE WITH A COALESCING AGENT

This application is a divisional of application Ser. No. 09/301,164, filed Apr. 28, 1999, which application(s) are incorporated herein by reference.

FIELD OF THE INVENTION

The invention relates to compositions and methods used in the formation of a polymer coating from a polymer particulate. The coatings of the invention can be made in a uniform continuous structure. Further, floor finishes having appropriate predetermined properties such as hardness, thickness, resiliency, and integrity can be made. One aspect of the invention is a two part coating system. A second aspect of the invention is a method for forming the polymer coating of the invention using the two part system and a number of distinct coating forming protocols. Another aspect of the invention is a floor finish system that results in substantial labor savings.

BACKGROUND OF THE INVENTION

Coating compositions are generally well known and have been formulated using a variety of technologies such as solvent based, aqueous liquid and powder systems. Powder coatings have been electrostatically applied to hard surfaces such as metals and then baked into a hard resistant finish. Reactive liquid coatings have been made by combining reactive materials (such as reactive isocyanates, ethylenically unsaturated reactive systems, reactive epoxy systems, etc.). Such systems have been applied to surfaces and then reacted to form a crosslinked hard surface. Further, coatings have been formed by dissolving typically polymeric materials in organic solvents at a solids concentration of about 10 to 50 wt.-%. Such solutions are applied and the solvent borne materials dry to a hard surface by the evaporation the solvent leaving a polymer coating. In order to increase the add-on of polymeric solids, polymer materials have been dispersed in aqueous media to form finish compositions. Lastly, aqueous technologies are used with active materials at concentrations typically higher than solvent systems. Such aqueous dispersions have been applied to surfaces for the purposes of forming a finish layer by serial application and evaporation of the water. Once the water is removed, the polymer materials form a useful film typically in a multi-coating layer. Solvent or aqueous based systems typically leave a residue of the medium in the coating.

Typical compositions and methods include those in Michio et al., Japanese Patent No. 92243309A. Michio et al. teach a aqueous/solvent coating composition for floors comprising a polymeric material combined with an ether solvent material adapted for reduced odor. Feigin, U.S. Pat. No. 4,131,585, teaches a polyether leveling agent adapted for use in aqueous self-polishing, dry bright coating compositions. Hacket et al., U.S. Pat. Nos. 4,363,835 and 4,704,429 and Zdanowski et al., U.S. Pat. No. 4,517,330, teach a method of forming floor finishes by applying an aqueous dispersion of polymer and materials and then dry buffing the resulting coating at high temperature to either fuse or crosslink the waxy or reactive coating composition. Bolgiano et al., U.S. Pat. No. 4,421,782, teach the formation of a coating from an aqueous system which after drying is radiation cured into a hard tough surface. Craven, U.S. Pat. No. 3,776,752, teaches compositions and methods for finishing surfaces. The method comprises applying a solvent dispersion of a polymer coating material, drying the applied material to form a coating and then forming the resulting coating with a finishing agent. Such finishing agents disclosed by Craven include typical plasticizing compositions. Lovell, Canadian Patent No. 717,495 (U.K. Patent No. 930,919), teaches the application of an organosol polish composition. Lovell discloses that the organosol material, when cosprayed with a solvent material, forms a combined coating which dries to a hard floor surface. Lewis et al., U.S. Pat. No. 4,168,255, and Gehman et al., U.S. Pat. No. 4,017,662, teach a polishing method involving the application of an aqueous coating composition containing a polymer material and finish forming agents. The polymeric materials combine with the agents as the aqueous material evaporates leaving a hard floor finish. Berrido, U.S. Pat. No. 4,747,880, teaches a dry granular floor care product. The dry granular material is formulated such that it can be combined with water to form an aqueous solution or dispersion which can be applied to form a clean shiny appearance after drying.

The prior art coating technology involves heat melted or fused coatings, reactive crosslinking coatings, or coatings that rely on a carrier liquid, an evaporating liquid aqueous or solvent medium for film formation. Such media involve solvents which must evaporate upon application to initiate coalescing the finish layer. Further the prior art aqueous compositions typically require two or more applications to form a finished surface having two or more distinct layers for a complete floor treatment. The typical applications of coatings to floors, walls, ceilings and other environmental hard surfaces can involve rolling, mopping, spray coating and other conventional methods. A combination of a resin, solvent (aqueous or organic), diluent, additives and pigment can be used. A survey of conventional coating composition and techniques is shown in *Kirk-Othmer Concise Encyclopedia of Chemical Technology*, Fourth Edition, Wiley Interscience Publications, pp. 469–482 (John Wiley & Sons, Inc. 1999).

A need exists for floor coating systems that can be used with minimal labor in forming a reliable coating with as little as one application of the coating system. The coating systems of the invention can be used without substantial heat input for curing or a substantial proportion of an organic carrier solvent or an aqueous medium.

BRIEF DISCUSSION OF THE INVENTION

We have found a two-part system that can be used in a method for forming a continuous hard durable coating on virtually any surface. The two-part system comprises a polymer first part in the form of a finely divided flowable powder or particulate that can be delivered to a surface without an aqueous or organic solvent or other carrier liquid. The second part is a liquid part comprising a liquid coalescent or coalescing agent. In use, the parts are combined on the floor surface or as they are being delivered to the floor surface. The coalescing agent causes the polymer powder uniformly distributed in a finely divided state to coalesce and form a uniform film or coating within a short time after it came in contact with the coalescent. The materials can be applied in one of three application regimens we have defined to date, others may be developed and used. The powder can be uniformly placed on a target surface first followed by a careful uniform application of the coalescing agent. Second, the coalescing agent can be placed on the target surface followed by a careful uniform application of the powder particle. Lastly, the materials can be formed into a fine dispersion of the material in air, combined in an application device and simultaneously delivered to the surface. In such a process, the powder and coalescing agent can be atomized in separate atomizers and combined after atomization to form a spray of the final coating components.

One important application of the coating technology of this invention is to form hard, uniform coatings with regular thickness and integrity on floors. These coatings are typically 1 to 20 microns, preferably 3 to 12 microns, most preferably 4 to 10 thickness. The floor finishes can have properties such as hardness, thickness, resiliency, integrity and wear resistance that meet or exceed requirements of current floor finish technology. Two or more coatings can be made if each coating provides a unique property. Layers of different hardness can be used. A first layer can be formed from a colored layer with a second uncolored clear layer. A first layer can be used with a second layer having a COF additive or biocide. A first acrylic layer can be used with a second urethane layer.

Floor surfaces that can be treated include installed floors, uninstalled sheet vinyl or uninstalled flooring units. The coatings can be applied during manufacture of the flooring as one of the final steps in manufacture, can be applied to the flooring at an installation site just prior to installation, can be applied to the floor after installation or during routine maintenance. The primary substrates or supports for conventional coating systems include paper and paperboard, polymer films such as polyethylene, polyethylene terephthalate, metal foils, woven and non-woven fabrics, fibers, metal coils and a variety of environmental surfaces including floors, walls, ceilings, hard surfaces, exterior walls and other rough, curved or flat surfaces. Each of these kinds of surfaces utilizes coating compositions and methods adapted for each coating environment. Many coating processes are used in the industry including methods that create single and multiple layers. The precision and uniformity of the coating is important for consistent coverage, uniform appearance and wear properties.

For the purpose of this patent application, the term "coating" refers to a single or multiple coating of a polymer material in a substantially uniform layer. In this application uniform indicates the thickness does not vary more than about ±3 microns, preferably ±2 microns, from place to place in the coating. Such a coating can be applied under factory conditions or in the field. The term "floor finish" typically connotes a floor coating having a thickness of greater than 1 micron but typically less than 12 microns, preferably less than 5, microns having a single layer formed from the coalesced distribution of the polymer particles. Such floor finishes can be applied during floor tile manufacture or at a building location. Traditional floor finish methods use multiple (typically 4 or 5) applications of the finish forming liquid to result in a multi-layer or laminate structure. Each layer typically have a thickness less than 2 microns, often as little as 1 micron. The technology of the invention, however, can be used to form multiple layers. The term "polymer particle" typically connotes a polymer material typically made by polymerizing ethylenically unsaturated monomers and then comminuting such a polymeric material into a particle or particulate collection. The particles in the particulate can have a major dimension less than about 40 microns, preferably less than about 25 microns but preferably greater than about 10 microns. The term "coalescing agent" typically connotes an organic or silicone liquid material that causes the polymer particle to coalesce into a single layer floor finish film having a dimension greater than about 1 micron but less than about 12 microns. Such coalescing agents are materials that can cause the polymer particles to flow of fuse into a continuous layer before evaporation and are typically organic materials with a relatively low VOC (volatile organic compound content), typically less than about 10 mm-Hg preferably less than 5 mm-Hg, often less than 1 mm-Hg. More volatile, higher VOC coalescing agents can be used in a factory location where dying speed is important. In such locations, higher VOC coalescing agents can be recovered and recycled during coating operations. The more volatile solvent coating media carrier materials typically have a VOC greater than 20 mm-Hg and more 25 to 80 mm-Hg. A coalescing agent can be identified as a coalescing agent using the following procedure. The polymer floor finish particulate or powder material can be placed on a surface of a glass dish or microscope slide. About 0.5 grams, or less, sufficient to thinly cover the glass surface, of the slide or dish is used. Onto the particulate or powder is added about an equal amount by weight of a candidate coalescing agent. The test or candidate coalescing agent can be lightly sprayed or added drop-wise to the polymer powder and lightly mixed to form a uniform glaze of the wetted polymer. Visual and microscopic observations will confirm if the candidate coalescing agent can form a coating. The coating should be formed within about 30 minutes, preferably less than 5 minutes.

The coating compositions of the invention can be used to form a finish on an individual flooring unit. A flooring unit is defined as sheet vinyl with a defined width and an optional or indeterminate length, a single uninstalled quarry tile, composite tile, vinyl tile, wooden flooring component such as pine strips or oak strips having milled tongue and groove installation components and other common stone, thermoplastic, linoleum, wood flooring components, etc. Such flooring units are designed to be delivered to an installation site and individually installed onto a rough floor or subfloor surface using adhesive compositions, mastic, metallic fasteners such as nails, wooden pegs, etc. Such flooring units are typically used to cover a rough floor or subfloor with a large number of units to form the final floor surface.

Each flooring unit can be covered with the compositions of the invention leasing a uniform continuous coating layer. The flooring unit can comprise sheet vinyl or an individual flooring unit that can have an area that range from about 5 to 2000 $cm^2$, more commonly 10 to 1000 $cm^2$. The most typical flooring unit comprises vinyl flooring made in the form of large rolled sheets with a width of 2 meters to 5 meters and an indeterminate length, about 5 to 6 $cm^2$. ceramic tile, a about 15 cm by 15 cm vinyl tile, a quarry tile having dimensions of from about 200 $cm^2$ to 1000 $cm^2$, flooring components having tongue and groove installation features that can have a width of from about 2 to about 20 cm and variable length from 25 inches to 350 cm. The surface area of each flooring unit can range from about 5 to about 5000 $cm^2$., commonly 10 to 4000 $cm^2$, commonly 20 to 1000 $cm^2$. When used in forming a coating layer on a flooring unit, the coalescing agent and the polymer particulate are typical materials of the invention. However, the coalescing agent used in a factory formed floor finish on a flooring unit can be of higher volatility than typical coalescing agents used in field applications. Factory manufacture of coating units using higher volatility coalescing agents can involve processes in which the volatilized coalescing agents are recovered, recycled and reused in the application rendering the higher volatility less problematic than their use in field applications. Further, factory application of the coating compositions on flooring units can involve the use of relatively high heat flux of incident energy. Such high heat energy use can result in more rapid coating formation and more rapid evaporation of the coalescing agent from the finished floor unit. The use of the methods and compositions of the invention in coating flooring units involves coating one substantially planar surface of the flooring unit without applying a coating to an installation, surface of the flooring unit. In other words, the surface of the flooring unit that is used to attach the flooring unit either to the rough floor or subfloor or to other flooring units are preferably not coated with the compositions of the invention. However, the exposed surface of the flooring unit obtains a complete continuous uniform coating of the compositions of the invention.

The coatings and finishes of the invention appear to the eye be substantially identical in gross appearance and when conventionally tested have properties similar to those of the prior art. In the coatings of the invention, however, the microscopic structure of the inventive coatings of this invention appears to be substantially different. In practice, the coating layers can appear substantially different under cross-sectional microscopic examination. The prior art coating are typically made with four or more applications of the liquid coating material forming a layered structure. This is a result of the limits of the application methods. Each individual layer has a thickness controlled by the viscosity of the liquid coating mixture. Useful viscosity materials require several applications. A coating of this invention is typically a single uniform layer structure greater than 1 micron, but typically less than 20 microns in thickness.

The polymer particulate compositions of the invention are typically substantially free of liquid organic or aqueous media, however, the coalescing agent can contain some proportion of water or solvent but rarely has greater than about 10 wt % water based on the total amount of coalescing agent. Further, the polymer particles can contain some water as a matter of impurity or residue from water based polymerization techniques, however, the amount of water present in the polymer particulate is typically less than 10 wt % of the total polymer material. Certainly, little or no free or flowalble water is used as an aqueous medium or carrier liquid to carry either the coalescing agent or the polymer particle onto the floor surface. For the purpose of this patent application, the term "floor surface" typically relates to a ceramic, terrazzo, concrete, quarry tile, vinyl, linoleum, wood composite or other conventional floor surface material. The compositions of the invention are typically used to coat a large area of floor in a single step. Accordingly, the processes of the invention are typically used in coating more than about 100 cm$^2$, preferably more than 0.9 m$^2$, most preferably more than 10 m$^2$, of floor surface area in a single step. Typically, the polymer and coalescent can be simultaneously applied to a surface. The compositions of the invention can also be applied using devices designed to cover 100 m$^2$ of floor surface in a good amount of time. One of ordinary skill in the art will readily appreciate that the polymer particulate or the coalescing agent can be distributed over a relatively small or large area of floor followed by a careful application of the other part of the two-part coating systems. Such a coating technique is substantially different than the application of a solvent or aqueous based medium in which the combined one-part materials are applied typically using a mop to distribute the combined materials in a relatively small location in building up a continuous coating on the floor surface. Lastly, one of ordinary skill in the art will readily appreciate that there is a substantial difference between the form of the materials typically considered to be coatings in an aqueous media or coatings in an organic solvent media when compared to coating materials of the invention comprising a flowable powder polymeric composition and a liquid considered to be a coalescing agent. Solvents typically do not become involved in coalescing polymer particles into a final coating. Coalescing agents, however, are comparatively lower in volatility than solvents. Coalescents are intimately involved in penetrating polymer particles, causing the polymer to fuse or flow, leaving a coated surface as the coalescent evaporates. The resulting coating exhibits coverage, consistency and uniform coating properties. Commonly, solvents or other liquid carrier media evaporate without causing any important change in polymer properties. A coalescing agent operates to modify the polymer properties of a coating system during fusing and coating formation. A plasticizer is different than a coalescing agent because after a plasticizer is incorporated into a polymer it is an essentially permanent part of the formulation. A plasticizer results in a permanent change in polymer properties including $T_g$ (glass transition temperature), rheology, tensile strength, film forming properties, etc. Lastly, the coatings of the invention are substantially free of aqueous or solvent residue in the coating layer.

DETAILED DISCUSSION OF THE INVENTION

The essential components of the compositions and methods of the invention can be found first in a powder particulate polymer part and second in a liquid coalescing agent part. The powder particulate polymer part typically comprises a flowable substantially dry particulate material made into a composition having a dimension of from about 3 to about 50 microns, preferably about 3 to about 15 microns. Often a blended particulate can have an advantage in friction or appearance. Such a blend can comprise a particulate with an average particle size of about 25 microns with a particulate of about 40 microns. The material is typically a dry, flowable, non-caking particulate. The polymer can be reduced to the desired particle size by spray drying from an emulsion or milled from a solid. Typically, the polymer particulate material of the invention are prepared by first polymerizing the material using conventional techniques such as those commonly employed in aqueous/solvent emulsion polymerization systems. The resulting product is then spray dried in conventional spray drying equipment to a dry polymer particle with the desired dimensions. Also, if the size of the polymer particles need adjusting to a reduced polymer particle size, the polymer can be comminuted in typical dry grinding/ball milling technology and then classified into particle sizes conventionally. The polymer materials are kept dry to a degree such that the polymer particulate material does not cake, but retains its free flowing characteristic. The polymer particles of the invention can be conventional coating polymers and can be made from a number of useful monomer materials and polymerization systems.

One advantage of the invention is that the coating powders useful in the practice of the invention can be prepared by non-conventional methods of preparing powders. Many critical properties of the coatings such as thickness, chargeability, fluidizing bed pressures, build thicknesses, percent overspray, etc., are determined by the shape, size, and size distribution of the powder. Conventional powders result from limited control over these parameters. The powders of the invention can be made by spray drying of coating powder composition or spray congealing of an atomized coating powder composition. The resulting product provides preferred particles with controlled size and narrow particle size distributions. These physical properties result in high powder transfer to a surface or substrate, and in uniform robust coatings.

Blends of monomers are used in a balanced ratios to obtain the desired glass transition temperature, hydrophobic/hydrophilic qualities, and in particular a desired minimum film forming temperature. Suitable monomers include methyl acrylate, ethyl acrylate, n-propyl acrylate, isopropyl acrylate, n-butyl acrylate, isobutyl acrylate, sec-butyl acrylate, n-amyl acrylate, isoamyl acrylate, n-hexyl acrylate, 2-ethylhexyl acrylate, n-octyl acrylate, 3,5,5-trimethylhexyl acrylate, n-decyl acrylate, n-dodecyl acrylate, isotridecyl acrylate, cetyl acrylate, octadecyl acrylate and n-butoxyethyl acrylate. Further n-amyl methacrylate, isoamyl methacrylate, n-hexyl methacrylate, 2-ethylbutyl methacrylate, 2-ethylhexyl methacrylate, n-octyl methacrylate, 3,5,5-trimethylhexyl methacrylate, n-decyl methacrylate, n-dodecyl methacrylate, isotridecyl methacrylate, octadecyl methacrylate and butoxyethyl methacrylate, can be used. Further, tert-butyl acrylate or methacrylate, tert-amyl acrylate or methacrylate, 1,1-dimethylbutyl acrylate or methacrylate and 1,1-dimethylhexyl acrylate or methacrylate. Further, isobornyl acrylate or methacrylate, cyclohexyl acrylate or methacrylate, acrylate or methacrylate, and phenyl acrylate or methacrylate can be used. Further, methyl methacrylate, but also ethyl methacrylate, n-propyl methacrylate, isopropyl methacrylate, n-butyl methacrylate, isobutyl methacrylate and sec-butyl methacrylate can be used. Further, vinyl formate, vinyl acetate, vinyl propionate, vinyl butyrate, vinyl hexanoate, vinyl octanoate and vinyl 2-ethylhexanoate can be used. Further, styrene, α-methylstyrene,2-, 3- or 4-vinyltoluene, 2,4-dimethylstyrene and 1-phenylpropene. Further, acrylic acid, methacrylic acid, crotonic acid, itaconic acid, citraconic acid, fumaric acid, maleic acid and maleic anhydride. Of these, acrylic acid and methacrylic acid are particularly suitable. Multifunctional hydrophilic monomers having at least one further functional group are monomers with amido groups, including N-substituted derivatives, such as alkoxyalkylamido- and alkylolamido (meth)acrylates, (meth)acrylamidoglycolic acid and esters and/or ethers thereof, with further olefinic double bonds, for example divinylbenzene, butanediol di(meth)acrylate or (meth)allyl(meth)acrylate, and with hydroxyl, amino, epoxy, oxazolinidyl, oxazinyl or ureido groups in the side chain. In an emulsion component, the cation $M^+$ is preferably ammonium, potassium or in particular sodium, but may also be lithium, trimethylammonium, triethylammonium, tri-n-butylammonium, tetra-n-butylammonium, triethanolammonium or triisopropanolammonium. Multifunctional monomers can be employed to crosslink polymer chains either through irreversible covalent bonding or through reversible coupling with divalent, trivalent, etc. metal ions. The polyvalent metal compound, if employed in the coatings, may be either a metal complex or a metal chelate. The polyvalent metal ions may be those of beryllium, cadmium, copper, calcium, magnesium, zinc, zirconium, barium, strontium, aluminum, bismuth, antimony, silver, lead, cobalt, iron, nickel or any other polyvalent metal or mixture thereof which can be added to the composition by means of an oxide, hydroxide, or basic, acidic, or neutral salt or complex or clathrate thereof which has appreciable solubility in water, such as at least about 1% by weight therein. The selection of polyvalent metal and the anion are governed by the solubility of the resultant meal complex in order. Zinc and cadmium are particularly preferred polyvalent metal ions. The ammonia and amine complexes (and especially those coordinated with $NH_3$) of these metals are particularly useful. Amines capable of so complexing include morpholine, monoethanol amine, diethylaminoethanol, and ethylenediamine. Polyvalent metal complexes (salts) or organic acids that are capable of solubilization in an alkaline pH range may also be employed. Such anions as acetate, glutamates, formate, carbonate, salicylate, glycollate, octoate, benzoate, gluconate, oxalate and lactate are satisfactory. Polyvalent metal chelates where ligand is a bidentate amino acid such as glycine or alanine may also be employed. The polyvalent metal compound must be such that the metal is available to serve its crosslinking function, i.e., it is dissociable to form polyvalent metal-containing ions. Preferred polyvalent metal compounds, complexes and chelates include zinc acetate, cadmium acetate, zinc glycinate, cadmium glycinate, zinc carbonate, cadmium carbonate, zinc benzoate, zinc salicylate, zinc glycollate and cadmium glycollate. Although the polyvalent metal compound may be added to the polish composition in dry form such as a powder, it is preferred to first solubilize the polyvalent metal compound using a fugitive ligand such as ammonia. For purposes of this invention a ligand is considered fugitive if at least a portion of said ligand tends to volatilize under normal film forming conditions. Since the ammonia may complex with the polyvalent metal compound, a compound such as zinc glycinate, when solubilized in dilute aqueous ammonia solution, may be named zinc amine glycinate.

The polyvalent metal compound when used is employed in an amount so that the ratio of polyvalent metal to the α,β-ethylenically unsaturated acid of the addition polymer varies from about 0.05 to 0.5, and preferably from about 0.2 to 0.3. This is expressed as the ratio of metal, such as $Zn^{++}$, to —COOH or —$COONH_4$ groups, a ratio of 0.5 being stoichiometric.

The polymer particulate materials of the invention can be formulated in a particle having a dimension of from 3 to 50 microns, or other preferred particle size as are discussed herein, with other compatible materials that aid in coating, film or finish formation and/or characteristics. Such ingredients include cooperative polymer materials, plasticizers, waxes, small amounts of solvents or liquids that aid in particle formation but do not act as liquid media. The compositions can also include biocides, gloss agents, deglossing agents, matte forming agents, friction ($TiO_2$, silica or other COF additives) modifiers and other additives common in coating formulations. Typical particulate formulations for the coating polymer is set forth in the following table. Further blending polymers with different $T_g$ can have useful properties. Relatively higher $T_g$ polymers can aid in forming regions of increased friction on the coating surface. Clearly film forming materials can be combined with both film forming and non-film forming materials. These materials can have a variety of particle sizes depending on desired properties.

| Particulate Polymer for Coatings | | | |
| --- | --- | --- | --- |
| Particulate Composition | Useful Wt. % | Preferred Wt. .% | Most preferred Wt. % |
| Acrylic polymer | 0 to 80 | 5 to 75 | 10 to 60 |
| Urethane polymer | 0 to 80 | 5 to 75 | 10 to 60 |
| Plasticizer | 0.1 to 35 | 0.5 to 30 | 1 to 25 |
| Wax | 0.1 to 15 | 0.2 to 12 | 0.1 to 10 |
| Resin Additive(s) | 0 to 15 | 0.1 to 12 | 0.2 to 15 |

Some polymers which would be useful are 60/40 MMA/MA, 55/40/5, MMA/MA/DMAM, 70/30 MMA/EA, 80/20 MMA/BA, 60/40 MMA/2EHA, 75/25 EMA/MA, 90/10 EMA/EA, 50/50 MMA/BMA, 88.5/715.5/88.5 MAA/Sty/AA. 60/39/1 MMA/MA/MAA, 34/28/25/5/8 MMA/BA/Sty/AN/MAA; wherein AA=Acrylic acid, MMA=Methyl methacrylate, MA=Methyl acrylate, EA=Ethyl acrylate, EMA=Ethyl methacrylate, AN=acrylonitrile, Sty=Styrene BA=Butyl acrylate, 2EHA=2-Ethylhexyl acrylate, BMA=Butyl ethacrylate, DMAM=Dimethylaminoethyl methacrylate and MAA=Methacrylic acid. Other Polymers include cellulosic types including cellulose acetate phthalate (CAP), cellulose acetate trimellitate (CAT), hydroxypropylmethyl cellulose phthalate (HPMCP), hydroxy propylmethyl cellulose acetate succinate (HPMCAS) and carboxymethylethyl cellulose (CMEC) vinyl types including polyvinyl alcohol acetate phthalate (PVAP) acryl types including copolymers of methacrylic acid and ethyl acrylate are used. Further, hydroxypropyl methylcellulose phthalate, cellulose acetate phthalate, methyl methacrylate/methacrylic acid copolymer, polyvinyl acetate phthalate, carboxymethyl ethylcellulose, polyvinyl alcohol phthalate, starch acetate phthalate cellulose acetate succinate, styrene/maleic acid copolymer, polyvinyl acetyl diethylaminoacetate, poly(dimethylaminoethyl methacrylate), benzylaminomethylcellulose, diethylaminomethylcellulose, benzylaminoethyl hydroxyethylcellulose, cellulose acetate diethylaminoacetate, cellulose acetate dibutylaminohydroxypropyl ether, sodium carboxymethylcellulose, methylcellulose, hydroxyethylcellulose, polyvinyl alcohol, gelatin, polyvinylpyrrolidone, pyrrolidone/vinyl acetate copolymer, polyethylene glycol, hydroxypropyl methylcellulose, hydroxypropylcellulose, vinylpyrrolidone/vinyl acetate copolymer, ethylcellulose, methylvinylpyridine/methyl acrylate methacrylate copolymer, acetylcellulose, nitrocellulose, polyvinyl acetate, shellac and mixtures of two or more thereof are useful.

Blends of the addition copolymers may be used. The polymers may also be graft copolymers including grafts of the monomers mentioned on shellac. The copolymer containing acid groups may be soluble or dispersible in aqueous alkaline media having a pH from 7.0 to 11, usually at least 7.5, and preferably from about 8.0 to 9.5, the pH being adjusted to achieve a water clear appearance.

The second necessary component, a coalescing agent or coalescent, is necessary in the production of a coherent film layer from the polymer particles. The fugitive coalescent agent enables or promotes the film forming characteristics of the polymer particles in the coating compositions. The term fugitive means the material eventually evaporates or escapes the coating during or after film formation. Some small proportion of coalescent residue can remain in the layer. The fugitive material which are preferred are at least partially water soluble higher boiling (about 150° to 200° C.) monohydric and polyhydric alcohols; and monoalkyl and dialkyl ethers of glycols, diglycols ether alcohols, and polyglycols where alkyl is straight or branched and has from 1 to 5 carbon atoms. Examples of such fugitive materials include diglyme, 2-butoxyethanol, 3-methoxybutanol-1, the monomethyl, monoethyl and monobutyl ether of diethyleneglycol, dipropylene glycol or polypropylene glycols, ethylene glycol, propylene glycol and polypropylene glycols. An evaporative coalescent temporarily reduces the film formation temperature and softens the polymer particulate. This allows the particles to fuse and form a continuous film layer. The final properties of the polymer film layer are established or expressed as the coalescent evaporates from the particles. Additional energy could be added to the coating to aid in the removal of the coalescing agent. The coalescent is used with the polymer at an amount of about 0.2 to 2 or about 0.5 to 1 part by weight of the coalescent for each part of the polymer. Additive materials can be added to the coalescent liquid to enhance the coalescent action. Such additives reduce surface tension at the particle coalescent interface. Such materials may include minor amounts of low molecular weight or lower (a $C_{1-6}$ linear or branched alcohol) or a surfactant.

A wide variety of materials capable of performing the aforementioned role in the film formation process. Some examples of liquids used in conjunction with acrylic based polymers include but are not limited to glycol ethers or ether alcohols, mono alkyl ether alcohols, etc. including diethylene glycol $C_{1-6}$ mono- or dialkyl ether, diethylene glycol ethyl ether, diethylene glycol butyl ether, dipropylene glycol methyl ether, tripropylene glycol ethyl ether, propylene glycol ethyl ether, glycol ether, triethylene glycol ethyl ether, etc. selected other coalescents can include texanol (isobutyrate), benzyl alcohol, 3-methoxybutanol-1. Examples of low volatility fugitive coalescents include the monomethyl, monoethyl and monobutyl ethers of diethylene glycol, triethylene glycol, dipropylene glycol and tripropylene glycol and also benzyl alcohol, isophorone and methoxybutanol.

A wide variety of materials can be used as a plasticizer. Any material that reduces the glass transition temperature can be defined as plasticizer. Plasticizers can enhance the properties of the polymer films and to ease their film formation. A plasticizer incorporates itself into the polymer matrix and permanently educes the polymer's glass transition temperature. This obtains a reduction in the polymer hardness and an increase in the polymer flexibility. The plasticizer also aids in he film formation process. While permanent plasticizers are not necessary in the film formation process plasticizers can provide useful properties. The polymer materials of the invention can be combined with plasticizers in a variety of ways. When the polymeric materials are spray dried, the polymers can be combined with plasticizers in the aqueous or solvent form solution prior to spray drying. During spray drying, the permanent plasticizers can combine with the polymers in the final flow of particles. Alternatively, the plasticizer can be added to the polymer particles during comminution or during milling prior to classification of the polymer/plasticizer composition into the correct particle size. Other ways of combining plasticizer and polymer are known in the art and can be used to result in a combined polymer plasticizer flowable particle. Examples of non-fugitive permanent plasticizers are pure or mixed diesters of phthalic acid with benzyl alcohol, butanol, hexanol, 2-ethylhexanol, cyclohexanol or octanol as alcohol component, pure or mixed benzoic and fatty esters of monohydric or polyhydric alcohols such as pentaerythritol, glycols and propylene glycols. Examples are polypropylene glycol adipate benzoate, diethylene glycol dibenzoate, dibenzyl sebacate, acetyl tributyl citrate and butyl phthalate-butyl glycolate. A structurally different group are triphenyl phosphate, tributyl phosphate and tributyoxyethyl phosphate. Tributoxyethyl phosphate is frequently also used as flow control agent.

Waxes are often used in conjunction with a polymer in the production of polymer films used as floor finishes. However, they are not a necessary component. They can serve a few purposes in a polymer film. Among these are modifications in the film durability, the buffability, the reparability, and the coefficient of friction. Waxes are oftentimes added to surface coatings. This is particularly true of acrylic floor finishes. In floor finish formulations, the emulsified wax should be added to the base polymer prior to drying to solid. In the case of acrylic floor finishes, the emulsified wax should be mixed with the acrylic latex and then spray dried. The resulting dry polymer is comprised of both wax and acrylic polymer. One could also envision the addition of wax along with the coalescing fluid. Furthermore, the addition of more liquid would result in longer cure times and therefore is not the preferred embodiment.

It is important that the wax remain as discrete particles in the film. It is that discrete particle character that manifests itself in film's properties. In the compositions of the present invention, the relative proportions of the polymer to wax are from 100:0 to 30:70 by weight. The variation in these relative proportions provides for various buffing characteristics. The wax used may be either natural or synthetic and of vegetable, animal or mineral origin and should have a melting point of at least 75° C. and preferably of at least 82° C. Some examples of these waxes include both high and low density polyethylene and polypropylene waxes, carnuba, montan, palm waxes, Chinese insect, ceresin, azocerite, microcrystalline waxes, Fisher-Tropsch wax. Mixtures of the waxes may be used. Waxes of lower melting points should not be used as the sole wax component, but can be blended with higher melting point waxes such that the aggregate melting point is about 75° C.

An alkali soluble resin may aid in film formation in floor finishes. These usually acid-functional resins may if desired also be used in a partially neutralized form. In floor finish formulations of the invention, the resin should be added to the base polymer prior to drying to solid. This is the preferred embodiment. The resulting polymer is comprised of both the base polymer and the resin. Examples of such alkali soluble resins are shellac, Manilla gum, Loba gum and alkali soluble alkyd resins which essentially represent polyesters of aliphatic dicarboxylic acids with aliphatic polyhydric alcohols, which may be modified with a $C_8$–$C_{18}$-fatty acid, glycerol esters of $C_8$–$C_{18}$-fatty acids and resin acids, for example abietic acid or rosin. But it is particularly advantageous to use addition copolymers of olefinically unsaturated acids and aromatic vinyl compounds, for example copolymers of acrylic acid, methacrylic acid and/or maleic anhydride with styrene.

In the methods of the invention, the coatings are made by combining the polymer particulate with a coalescing liquid agent at preferred proportions. Since certain agents are more or less effective as a coalescing agent, there is a broad range of proportions useful in the invention that can result in the formation of an excellent coating of beneficial properties. The coatings of the invention can be formed on flooring materials at a floor manufacturing plant. In such a process, flooring units, such as a vinyl tile, ceramic tile, milled oak or pine board, etc. can be coated as described in this application. Onto the tile unit or wood flooring unit is placed typically simultaneously the particulate and coalescing agent of the invention. As described above, the polymer particle or the coalescing agent can be separately added. The coalescing agent is permitted to form the continuous finish layer during processing. The coalescing agent is typically removed by evaporation during the operations or immediately thereafter. In a flooring manufacturing location, additional energy can be applied to the flooring to speed coalescing agent removal. Typical factory applications permit the use of higher VOC coalescing agents. Such agents can be substantially recovered in recovery systems after evaporation and recycled. The ratio of combining the polymer with a coalescing agent are shown in the following table of coating systems.

| | | Coating Systems | | |
|---|---|---|---|---|
| Composition | Nature | Useful Range- (wt./wt.) | Preferred Range (wt./wt.) | Most Preferred (wt./wt.) |
| Polymer | particulate | 1 | 1 | 1 |
| Coalescing agent | liquid | 0.1 to 2 | 0.2 to 1 | 0.5 to 1 |

Experimental Section

The following coating examples highlight the coating formation characteristics of the compositions of the invention. We have provided a number of examples that illustrate the spirit of the invention using three different acrylic based polymers, a cellulosic polymer and a number of different coalescing agents. The coatings exhibit useful hardness, uniformity, resiliency, integrity, durability, and flexibility. The coatings in the examples are evaluated for gloss. Gloss provides an indication of proper film formation. A discussion of the results of scanning electron microscopy (SEM) analysis of the coatings are also included. The SEM analysis is used to confirm coherent film formation. Examples using three conventional Rohm & Haas polymeric coating compositions other coating agents and differing coalescing agents are provided. The examples include the coating of glass microscopic slides, ceramic tile, and vinyl composite tile.

EXAMPLE 1

The polymer used was a non-crosslinked Rohm & Haas UHS plus product. The polymer was spray dried from an aqueous latex to a dry flowable powder with a mean particle diameter of approximately 7 $\mu$M. The coalescing agent was a mixture of isopropanol (10 wt.-%) in diethylene glycol monoethyl ether.

Coatings were formed on the surface of a 1"×3" microscopic glass slide A pump-up aerosol liquid spray bottle was used to deliver a uniform spray of the coalescing agent on the slide. Onto the slide surface, distributed evenly on the glass, was placed 0.005 grams of the spray dried polymer particulate. About equal proportions of the coalescing agent was briefly sprayed onto the polymer coated glass surface. The polymer and coalescent system was allowed to stand alone and begin the film formation process for approximately 30 seconds. After the initial 30 seconds, a visible glaze was spread evenly over the surface. The final coating was uniform and glossy.

Microscopic observations were conducted with a 200×Nikon Optiphax-PDL Optical Microscope. Microscopic Observations included excellent film formation observed under 200× magnification. No original particle definition is observable in the film. This observation suggests that a tight and coherent film has been formed. A scrape across the surface of the coated slide reveals that the coating layer is consistent throughout the surface of the slide. The film looks nearly identical to the slides produced from conventional aqueous acrylic latex materials. Visual Observations of the gross coating showed that the coating is transparent and glossy. The surface appears to be coated evenly.

EXAMPLE 2

The polymer used was a mixture of the composition listed in Table No. 1. The mixture was diluted with water and then spray dried to mean particle diameter of approximately 10 µM.

TABLE 1

| Order of Addition | Coating Component | Amount wt % |
|---|---|---|
| 1 | Conrez polymer (25 wt % solids) | 4.7 |
| 2 | Tributoxy ethyl phosphate | 2.4 |
| 3 | Dibutylphthalate | 3.1 |
| 4 | NT-2624 Acrylic polymer (38 wt % solids) | 77.9 |
| 5 | AC-325 polyethylene wax | 5.9 |
| 6 | E-43 Polypropylene wax | 6.1 |

The coalescing agent used was 100% diethylene glycol monobutyl ether (Butyl Carbitol). The procedure was substantially the same as that in Example 1. In the microscopic observations, we observed that the level of film formation, under 200× magnification, is good. The surface appears completely covered with polymer coating and no original particle definition can be observed suggesting that a tight and coherent film has been formed. Ridges are observable in the film layer, the ridges are most likely the result of the spreading of the glaze over the surface A scrape across the surface of the coated slide reveals that the polymer covers the entire surface of the slide. Visual Observations of the coating revealed that the coating is uniform, transparent and glossy. There is some noticeable diffraction/light scattering that most likely results from the ridges. There is no noticeable haze in the film.

EXAMPLE 3

The polymer used was a latex of the Rohm & Haas Rhoplex NTS-2923 acrylic polymer that was allowed to air dry into a solid polymer. The solid polymer was crushed to a fine powder with a mortar and pestle. The Coalescing Agent was 100% diethylene glycol monobutyl ether (tradename Butyl Carbitol). The surface of a 1" by 3" microscopic glass slide was covered. The crushed polymer powder (0.005 gram) was sieved onto the glass surface through a 20 µCM screen. The coalescing agent then was briefly sprayed onto the polymer coated glass surface. The polymer/coalescent system was allowed to stand alone and begin the film formation process for approximately 30 seconds. After the initial 30 seconds, the glaze was spread evenly over the surface. Microscopic Observations were made through a 200× Optical Microscope. The surface appeared glossy and was completely covered with polymer, this suggests that a tight and coherent film has been formed. Some particle definition can be observed, this results from some incomplete film formation in some of the particles. The observed level of film formation, under 200× magnification, was possibly be the result of the larger, crushed particles used. A scrape across the surface of the coated slide reveals that the coating layer is consistent throughout the surface of the slide. Visual Observation with naked/unassisted eye revealed that the coating is transparent and glossy. The surface appears to be coated evenly, with no evidence of the method of application visible. Some "orange peeling"/light scattering is observable—most likely results from some of the imperfections noted under magnification. The coating appears to be continuous, coherent and substantially uniform but has some minor surface depressions or dimples resulting from polymer flow. Such surface features do not interrupt coating formation.

EXAMPLE 4

The polymer used was a non-crosslinked version of the Rohm & Haas UHS Plus polymer. The polymer was spray dried from an aqueous emulsion to a mean particle diameter of approximately 7 µM. The coalescing Agent was 100% diethylene glycol monoethyl ether (tradename Carbitol). The surface Coated was a 1 foot by 1 foot black ceramic tile. The application procedure was an application of 0.5 grams of the spray dried polymer distributed evenly on the ceramic tile followed by the spraying of the coalescing agent onto the polymer coated ceramic surface. The polymer/coalescent system was allowed to stand alone and begin the film formation process for approximately 30 seconds. After the initial 30 seconds, the glaze was spread evenly over the surface. Visual Observations made with the naked/unassisted eye included a coated surface that appeared clear and glossy. No noticeable orange peeling or particle definition formed in the surface. The coating looks like the coatings derived from aqueous latex acrylics. The surface appeared to be coated evenly with no evidence of the method of application.

EXAMPLE 5

The polymer used was a non-crosslinked Rohm & Haas UHS Plus polymer The polymer was spray dried from an aqueous emulsion and processed to a mean particle diameter of approximately 7 µM. Isopropanol (IPA wetting agent) at 10 wt %, in diethylene glycol monoethyl ether (tradename Carbitol) was used as a coalescent. The surface Coated was a 1 foot by 1 foot black vinyl composition tile. Approximately 0.5 grams of the spray dried polymer was distributed evenly on the vinyl tile. The coalescing agent was briefly sprayed onto the polymer coated vinyl surface. The polymer/coalescent system was allowed to stand alone and begin the film formation process for approximately 30 seconds. After the initial 30 seconds, the glaze was spread evenly over the surface. Visual Observations with the naked/unassisted eye showed that the coated surface appeared clear and glossy with no noticeable "orange peeling" or particle definition. The coating looks like the coatings derived from aqueous latex acrylics. The surface appears to be coated evenly, there is no evidence of the method of application.

EXAMPLE 6

The polymer used was a mixture of the composition listed in Table No. 2. The mixture was diluted with water and then spray dried to mean particle diameter of approximately 10 µM.

TABLE 2

| Order of Addition | Coating Component | Amount wt % |
|---|---|---|
| 1 | Conrez polymer (25 wt % solids) | 4.7 |
| 2 | KP-140 Plasticizer | 2.4 |
| 3 | Dibutyl Phthalate | 3.1 |
| 4 | 38% NT-2624 Acrylic Polymer (38 wt % solids) | 77.9 |
| 5 | AC-325 polyethylene wax | 5.9 |
| 6 | E-43 Polypropylene wax | 6.1 |

The coalescing agent was diethylene glycol monoethyl ether (tradename Carbitol). The surface coated was a 1 foot by 1 foot black vinyl composition tile. Approximately 0.5 grams of the spray dried polymer distributed evenly on the vinyl tile. The coalescing agent was sprayed onto the polymer coated vinyl surface. The polymer/coalescent system was allowed to stand alone and begin the film formation process for approximately 30 seconds. After the initial 30 seconds, the glaze was spread evenly over the surface. Visual observations with the naked/unassisted eye revealed that the coated surface appears hazy and of a matte finish. There is no noticeable orange peeling or particle definition to be seen. The surface is streaked with regions of greater haze and the method of application is noticeable. The coating appears to cover the entire surface area.

EXAMPLE 7

Using the method of the previous examples solid sodium carboxymethylcellulose from Aqualon was crushed to a fine powder with a mortar and pestle. The coalescing agent was 40% by weight ethyl alcohol in water The surface coated was a 1" by 3" microscopic glass slide. About 0.005 grams of the crushed polymer powder sieved was onto the glass surface through a 20 $\mu$M screen. The coalescing agent was sprayed onto the polymer coated glass surface. After a few seconds, the resulting glaze was spread over the slide surface. Microscopic observations revealed that the level film formation was good. The surface appears completely covered with polymer, this suggests that a tight and coherent film has been formed. A scrape across the surface of the coated slide reveals that the coating layer is consistent throughout the surface of the slide. Visual Observations using the naked/unassisted eye revealed a coating that was transparent and glossy.

SEM Evaluation

Scanning Electron Microscope (SEM) observations of coated glass slides were made to compare coatings. Polymer films similar to those of Example 1 were compared with coatings produced with conventional aqueous emulsions finishes.
Slide preparation/composition for SEM Evaluation
Slide No. 1: Conventional control coating. A 1" by 3" glass slide was coated with conventional floor finish and allowed to cure on the slide.
Slide No. 2: A coated Slide was made using the coating in Example No. 1. A 1" by 3" glass slide was coated from particles with the 7 $\mu$M non-crosslinked UHS Plus polymer particles. Diethylene glycol mono-ethyl ether was used as the coalescent. The polymer particles were allowed to coalesce and cure on the slide.
Slide No. 3: Example No. 2 coating material. A 1" by 3" glass slide was coated from particles with the 10 $\mu$M polymer particles described in Example No. 2. Diethylene glycol mono-ethyl ether (Carbitol) was used as the coalescent. The polymer particles were allowed to coalesce and cure on the slide.
Slide No.4: Aqueous Example No.2 Material Coated Slide A 1" by 3" glass slide was coated with an aqueous emulsion of the material described in Example No. 2. The Carbitol coalescent was then sprayed on the liquid emulsion and mixed. The liquid was allowed to cure on the slide. This slide was prepared as a control for the third SEM slide.
SEM Observations: Gold Coated Image
Slide No. 1: The conventional control coating, at 3000× magnification, forms a surface that is smooth and there is no visible particle definition. This suggests that the particles form into a tight film layer. There are sporadic dimples in the surface. The dimples seem to be no bigger than 1 $\mu$M in diameter
Slide No. 2: Example No. 1 Material There is quite a bit of variation in the coating under 3000× magnification. Original particle definition cannot be observed in any area of the slide. This suggests that the particles coalesced into a tight film layer.
Slide No. 3: Example No. 2 Material At 3000×magnification, the surface is smooth and there is no visible original particle definition. This suggests that the particles coalesced into a tight film layer. There are sporadic dimples in the surface. The dimples are seem to be no bigger than 1 $\mu$M in diameter and seem similar to the ones noted in slide No. 1.
Slide No. 4: Aqueous Example No 2 Material Coated Slide. At 3000×magnification, no original particle definition can be noted. This suggests that the particles coalesced into a tight film layer.

The analysis seems to have proven that the coating particles of the invention have coalesced into a coherent and tight film. Evidence for this conclusion can be drawn from the lack of visible original particle definition. Improper film formation observable as visible faults between particles having a mean diameter of greater than around 20 $\mu$M, was not seen.

The coatings of the invention can be modified using coatings technology to incorporate useful properties into the coatings. The coatings can be antimicrobial, protective, antistatic, removable, have high coefficients of surface friction, act as biocidal films against the growth of adventitious organisms such as barnacles and zebra mussels, removable systems that act as cleaners by enveloping or incorporating dirty layers that are removed along with the coatings, can act as medical coatings for skin and medical devices and protective coatings for optical structures. In this regard, antibacterial antifungal properties of the films can be enhanced using metal additives such as manganese or copper, titanium dioxide, silver or organic antimicrobial materials such as quats, hexachlorophene and others. GRAS materials can be used in the manufacture of coatings for foods such as plants, stems, leaves, fruits and others. Specialized coatings developed for particular locations such as food surfaces, dairies, electronic factories, greenhouses, kitchens, nursing homes, hospitals, surgical theaters, hotel rooms, bathrooms, factory floors, ceramic or polyester containers, car surfaces and other known surfaces. Specific products envisioned include antifouling coatings for ships, preservative coatings for woods, metal coatings for food processing equipment, antistatic surfaces for electronic equipment and explosive environments, graffiti resistant coatings for municipal environment, grass, food coatings, stain resistant coatings and others.

The above specification example and data filly explain the operations of the floor finish compositions and methods. The invention can have a variety of embodiments and applications without departing from the spirit and scope of the invention. The invention resides in the claims hereinafter appended.

We claim:
1. A method of forming a coating layer on a substrate, the coating layer comprising a unitary layer having a thickness of about 1 to about 20 microns, the method comprising:
   (a) combining at a treatment locus on the substrate;
      (i) a liquid coalescing agent; and
      (ii) a polymer composition having a particle size useful in film formation, the polymer substantially free of an aqueous or solvent medium; and
   (b) permitting the coalescing agent to convert the polymer particles composition into a substantially continuous coating.
2. The method of claim 1 wherein the coalescing agent comprises a non-organic silicone.
3. The method of claim 1 wherein the coalescing agent comprises a liquid with a VOC less than 5 mm-Hg and the coalescing agent substantially evaporates during coating formation.

4. The method of claim 1 wherein the coalescing agent comprises a liquid terpene comprising a diterpene, a triterpene or higher terpene or mixtures thereof.

5. The method of claim 1 wherein the coalescing agent comprises an ether alcohol having a VOC of less than 5 mm-Hg.

6. The method of claim 5 wherein the coalescing agent comprises a mixture of a lower alcohol and the ether alcohol.

7. The method of claim 5 wherein the coalescing agent comprises a $C_{1-6}$ monoalkyl or dialkyl ether of a polyalkylene glycol.

8. The method of claim 1 wherein the polymer has a particle size less than 50 µm.

9. The method of claim 1 wherein the polymer has a particle size less than 40 µm.

10. The method of claim 1 wherein the polymer has a particle size of about less than 15 µm.

11. The method of claim 5 wherein the coalescing agent comprises diethylene glycol mono $C_{1-6}$ alkyl ether.

12. The method of claim 5 wherein the coalescing agent comprises an $C_{1-6}$ alkyl ether of an alkylene glycol.

13. The method of claim 5 wherein the coalescing agent comprises diethylene glycol ethyl ether.

14. The method of claim 5 wherein the coalescing agent comprises ethylene glycol mono alkyl ether.

15. The method of claim 5 wherein the coalescing agent comprises ethylene glycol mono ethyl ether.

16. The method of claim 1 wherein there are about 0.2 to about 2 part of the coalescing agent per each part by weight of the polymer and the resulting coating has a thickness greater than 3 microns.

17. The method of claim 1 wherein there are about 0.5 to about 1 part of the coalescing agent per each part by weight of the polymer and the resulting coating has a thickness greater than 3 microns.

18. The method of claim 1 wherein the polymer composition comprises a, polymer and plasticizer.

19. The method of claim 18 wherein the polymer composition also comprises a wax and the substrate comprises a floor surface.

20. The method of claim 1 wherein the polymer composition comprises a vinyl polymer.

21. The method of claim 20 wherein the vinyl polymer composition comprises a styrene polymer.

22. The method of claim 20 wherein the vinyl polymer composition comprises an acrylic comprising methyl methacrylate, n-butyl acrylate or mixtures thereof.

23. The method of claim 1 wherein the polymer composition comprises an urethane polymer.

24. The method of claim 1 wherein the finish has a thickness of about 3 to about 10 microns.

25. The method of claim 1 wherein the finish polymer composition is placed on the substrate prior to the coalescing agent.

26. The method of claim 1 wherein the coalescing agent is placed on the substrate prior to the polymer composition.

27. The method of claim 1 wherein the coalescing agent and the polymer composition are separately atomized to form an atomized coalescent and an atomized polymer composition and the atomized coalescing agent and the atomized polymer composition are combined to form a spray treatment composition directed to the treatment locus.

28. The method of claim 1 wherein the coating is formed in less than 60 minutes.

29. The method of claim 1 wherein the coating is formed in less than 10 minutes.

30. The method of claim 1 wherein the coalescent layer evaporates with no energy input to cure the layer other than ambient energy.

31. The method of claim 1 wherein the substrate comprises a planar substrate.

32. The method of claim 1 wherein the substrate comprises a curved substrate.

33. The method of claim 1 wherein the substrate comprises a substrate with complex surface.

34. The method of claim 1 wherein the polymer is a cellulosic composition and the coalescing agent is an aqueous solution of a lower alcohol.

35. The method of claim 1 wherein the polymer comprises a vinyl polymer comprising styrene and an acrylic monomer.

36. The method of claim 35 wherein the acrylic monomer comprises methyl methacrylate, butyl acrylate or mixtures thereof and the coalescing agent comprises an ether alcohol.

37. The method of claim 35 wherein the coalescing agent comprises an ether alcohol and a lower alcohol.

38. The method of claim 35 wherein the coalescing agent comprises a polyalkylene glycol $C_{1-6}$ alkyl ether.

39. The method of claim 35 wherein the coalescing agent comprises a dialkylene glycol $C_{1-6}$ alkyl ether.

40. The method of claim 35 wherein the coalescing agent comprises a monoalkylene glycol monoalkyl ether.

41. The method of claim 35 wherein the coalescing agent comprises a diethylene glycol $C_{1-6}$ alkyl ether.

42. The method of claim 35 wherein the coalescing agent comprises a monoethylene glycol $C_{1-6}$ alkyl ether.

43. The method of claim 35 wherein the coalescing agent comprises a diethylene glycol monoethyl ether.

44. The method of claim 35 wherein the coalescing agent comprises a ethylene glycol monoethyl ether.

45. A method of forming a coating layer on a floor surface, the finish layer comprising a unitary layer having a thickness of about 1 to about 20 microns, the method comprising:
   (i) combining on a floor treatment locus, the locus having an area of greater than about 0.09 meter$^2$;
      (a) a liquid coalescing agent having a VOC less than 10 mm-Hg; and
      (b) a particulate floor finish polymer composition comprising an acrylic polymer, a urethane polymer or mixtures thereof, the particulate having a particle size of about 3 to about 50 microns; and
   (ii) permitting the coalescing agent to convert the polymer composition into a continuous floor finish in a time period of less than about 60 minutes.

46. The method of claim 45 wherein the coalescing agent has a VOC of less than 5 mm-Hg and substantially evaporates before the finish is formed.

47. The method of claim 45 wherein the polymer has a particle size of 10 to 35 µm.

48. The method of claim 45 wherein the polymer is free of a liquid aqueous or solvent medium.

49. The method of claim 45 wherein the coalescing agent comprises an ether alcohol with a VOC less than 1 mm-Hg.

50. The method of claim 49 wherein the coalescing agent comprises a mixed lower alcohol and ether alcohol.

51. The method of claim 49 wherein the coalescing agent comprises an alkyl ether of an polyalkylene glycol.

52. The method of claim 49 wherein the coalescing agent comprises diethylene glycol mono alkyl ether.

53. The method of claim 49 wherein the coalescing agent comprises diethylene glycol ethyl ether.

54. The method of claim 49 wherein the coalescing agent comprises a monoalkyl or dialkyl ether of an alkylene glycol.

55. The method of claim 49 wherein the coalescing agent comprises ethylene glycol mono alkyl ether.

56. The method of claim 49 wherein the coalescing agent comprises ethylene glycol ethyl ether.

57. The method of claim 45 wherein the coalescing agent comprises a liquid terpene comprising a diterpene, a triterpene or higher terpene or mixtures thereof.

58. The method of claim 45 wherein the coalescing agent comprises a cyclic silicone.

59. The method of claim 45 wherein there are about 0.2 to about 2 part of the coalescing agent per each part by weight of the polymer.

60. The method of claim 45 wherein there are about 0.5 to about 1 part of the coalescing agent per each part by weight of the polymer.

61. The method of claim 60 wherein the polymer composition comprises a polymer and plasticizer.

62. The method of claim 61 wherein the polymer composition also comprises a wax.

63. The method of claim 45 wherein the polymer composition comprises a vinyl polymer.

64. The method of claim 63 wherein the polymer composition comprises a styrene polymer.

65. The method of claim 63 wherein the polymer composition comprises an acrylic comprising methyl methacrylate, n-butyl acrylate or mixtures thereof.

66. The method of claim 45 wherein the polymer composition comprises an urethane polymer.

67. The method of claim 45 wherein the finish has a thickness of about 3 to about 10 microns.

68. The method of claim 45 wherein the finish polymer composition is placed on the substrate prior to the coalescing agent.

69. The method of claim 45 wherein the coalescing agent is placed on the substrate prior to the polymer composition.

70. The method of claim 45 wherein the coalescing agent and the polymer composition are separately atomized to form an atomized coalescent and an atomized polymer composition and the atomized coalescing agent and the atomized polymer composition are combined to form a spray treatment composition directed to the treatment locus.

71. The method of claim 45 wherein the coating covers the entire available surface.

72. The method of claim 45 wherein the coating covers at least 5% of the available surface.

73. The method of claim 45 wherein the coalescent layer evaporates with no energy input to cure layer other than ambient energy.

74. The method of claim 45 wherein the substrate comprises a planar substrate.

75. The method of claim 45 wherein the substrate comprises a curved substrate.

76. The method of claim 45 wherein the substrate comprises a substrate with complex surface.

77. The method of claim 45 wherein the locus has an area of greater than 10 $m^2$.

78. The method of claim 45 wherein the polymer comprises a vinyl polymer comprising styrene and an acrylic monomer.

79. The method of claim 78 wherein the acrylic monomer is methyl methacrylate, butyl acrylate or mixtures thereof and the coalescing agent comprises an ether alcohol.

80. The method of claim 78 wherein the coalescing agent comprises an ether alcohol and a lower alcohol.

81. The method of claim 78 wherein the coalescing agent comprises a polyalkylene glycol $C_{1-6}$ alkyl ether.

82. The method of claim 78 wherein the coalescing agent comprises a dialkylene glycol $C_{1-6}$ alkyl ether.

83. The method of claim 78 wherein the coalescing agent comprises a monoalkylene glycol monoalkyl ether.

84. The method of claim 78 wherein the coalescing agent comprises a diethylene glycol $C_{1-6}$ alkyl ether.

85. The method of claim 78 wherein the coalescing agent comprises a monoethylene glycol $C_{1-6}$ alkyl ether.

86. The method of claim 78 wherein the coalescing agent comprises a diethylene glycol monoethyl ether.

87. The method of claim 78 wherein the coalescing agent comprises an ethylene glycol monoethyl ether.

* * * * *